United States Patent
Cody et al.

(10) Patent No.: US 10,618,588 B2
(45) Date of Patent: Apr. 14, 2020

(54) SPROCKET GUARD

(71) Applicant: GATES CORPORATION, Denver, CO (US)

(72) Inventors: Michael Cody, Boulder, CO (US); Chris Vasiliotis, Denver, CO (US)

(73) Assignee: Gates Corporation, Denver, CO (US)

( * ) Notice: Subject to any disclaimer, the term of this patent is extended or adjusted under 35 U.S.C. 154(b) by 113 days.

(21) Appl. No.: 15/840,227

(22) Filed: Dec. 13, 2017

(65) Prior Publication Data

US 2019/0176920 A1    Jun. 13, 2019

(51) Int. Cl.

| | |
|---|---|
| *B62J 13/00* | (2006.01) |
| *B62M 9/00* | (2006.01) |
| *F16H 55/30* | (2006.01) |
| *B62M 9/10* | (2006.01) |
| *B62J 13/06* | (2006.01) |
| *B62M 9/128* | (2010.01) |
| *F16H 55/17* | (2006.01) |
| *B62M 9/138* | (2010.01) |

(52) U.S. Cl.
CPC .............. *B62J 13/00* (2013.01); *B62J 13/06* (2013.01); *B62M 9/00* (2013.01); *B62M 9/105* (2013.01); *B62M 9/128* (2013.01); *F16H 55/30* (2013.01); *B62M 9/138* (2013.01); *F16H 55/171* (2013.01)

(58) Field of Classification Search
CPC . B62J 13/00; B62J 13/06; B62M 9/00; B62M 9/105; B62M 9/126; B62M 9/128; B62M 9/138; B62M 9/136; B62M 2009/007; F16H 55/30

USPC .......................................................... 474/144
See application file for complete search history.

(56) References Cited

U.S. PATENT DOCUMENTS

| | | | | |
|---|---|---|---|---|
| 3,477,303 A | * | 11/1969 | Brilando | B62M 9/105 |
| | | | | 474/144 |
| 3,815,439 A | * | 6/1974 | Tarutani | B62M 9/10 |
| | | | | 474/144 |
| 4,106,357 A | * | 8/1978 | Segawa | B62M 9/105 |
| | | | | 29/893.33 |

(Continued)

FOREIGN PATENT DOCUMENTS

DE        202013103872    *   7/2013   ............... B62J 13/00

OTHER PUBLICATIONS

European Patent Office, International Search Report and Written Opinion of the International Searching Authority, International application No. PCT/US2018/064998, dated Apr. 9, 2019.

(Continued)

*Primary Examiner* — Michael R Mansen
*Assistant Examiner* — Raveen J Dias
(74) *Attorney, Agent, or Firm* — Paul N. Dunlap, Esq.

(57) ABSTRACT

A sprocket guard assembly comprising a sprocket having sprocket radial spokes, and having teeth on an outer perimeter, the teeth disposed in a plane CL1, each sprocket radial spoke communicating with a first cylindrical surface, a circular member having circular member radial spokes, and each circular member radial spoke communicating with a second cylindrical surface, a collar having an outer cylindrical surface, a fastener engaging the collar, the first cylindrical surface and the second cylindrical surface engaging the outer cylindrical surface, all coplanar in a plane CL2, and plane CL1 is offset from plane CL2.

5 Claims, 5 Drawing Sheets

(56) References Cited

U.S. PATENT DOCUMENTS

| | | | |
|---|---|---|---|
| 4,240,303 A * | 12/1980 | Mosley | B62M 9/00 474/144 |
| 4,318,310 A * | 3/1982 | Segawa | B62K 19/34 29/893.33 |
| 4,487,424 A * | 12/1984 | Ellis | B62J 13/00 280/304.3 |
| 4,741,724 A * | 5/1988 | Wang | B62M 9/105 474/160 |
| 4,798,565 A | 1/1989 | Boyd | |
| 5,003,840 A * | 4/1991 | Hinschlager | B62J 23/00 280/152.1 |
| 5,354,243 A | 10/1994 | Kriek | |
| 5,644,953 A | 7/1997 | Leng | |
| 5,725,450 A * | 3/1998 | Huskey | B62M 9/06 474/116 |
| 6,443,865 B1 * | 9/2002 | Yamanaka | B62J 13/00 474/144 |
| D545,333 S * | 6/2007 | Clarke | D12/123 |
| 7,503,864 B2 | 3/2009 | Nonoshita et al. | |
| D592,107 S * | 5/2009 | Clarke | D12/123 |
| 7,544,154 B2 | 6/2009 | Corbalis et al. | |
| 7,824,287 B2 | 11/2010 | Nonoshita et al. | |
| 7,850,564 B2 | 12/2010 | Nonoshita | |
| 8,696,503 B2 | 4/2014 | Oishi et al. | |
| 8,888,629 B2 | 11/2014 | Ji | |
| 8,905,878 B2 | 12/2014 | Loy et al. | |
| 8,956,254 B2 | 2/2015 | Tokuyama et al. | |
| 8,978,514 B2 | 3/2015 | Shiraishi | |
| 9,297,452 B2 | 3/2016 | Iwai et al. | |
| 9,701,364 B2 | 7/2017 | Sugimoto et al. | |
| 10,065,703 B2 * | 9/2018 | De Pretto | B62M 3/00 |
| 2006/0058139 A1 * | 3/2006 | Fry | B62J 13/00 474/144 |
| 2006/0258498 A1 * | 11/2006 | Tabe | B62M 9/105 474/160 |
| 2006/0264286 A1 * | 11/2006 | Hodjat | F16H 55/171 474/152 |
| 2008/0289927 A1 | 11/2008 | Ji | |
| 2012/0172165 A1 * | 7/2012 | Schroedl | B62M 9/02 474/160 |
| 2013/0143703 A1 * | 6/2013 | Schlumpf | F16H 55/12 474/152 |
| 2018/0229793 A1 * | 8/2018 | Cody | F16H 55/30 |

OTHER PUBLICATIONS

Taiwan, The Intellectual Property Office Letter of Examination Report, and Search Report for Taiwan Patent application No. 107145043; date of completing the search: Jul. 8, 2019.

* cited by examiner

SPROCKET GUARD

FIELD OF THE INVENTION

The invention relates to a sprocket guard, and more particularly, to a sprocket guard capable of retrofit comprising a coplanar sprocket surface, guard surface and fastener collar surface.

BACKGROUND OF THE INVENTION

Bicycling is becoming an increasingly more popular form of recreation as well as a means of transportation. An area that has been extensively redesigned over the years is the bicycle drive train.

One particular component of the drive train that has been redesigned is the front sprocket assembly. Front sprocket assemblies have been provided with chain/spoke protectors adjacent to the sprocket to prevent shoelaces and clothing from becoming entangled.

Typically, the prior chain/spoke protectors are either attached to the crank hub or attached to the largest sprocket using an axial snap fit. While these prior spoke/chain protectors generally work well, they are typically attached as an original component. Opportunities for retrofit a guard are minimal in these cases. There has been a demand for components that can be retrofit to existing bicycle cranks that are relatively simple to manufacture and assemble.

In view of the above, it will be apparent to those skilled in the art from this disclosure that there exists a need for an improved bicycle sprocket guard.

Representative of the art is U.S. Pat. No. 8,888,629 which discloses a bicycle sprocket assembly includes a sprocket element and a chain protector. The sprocket element has a plurality of teeth disposed on an outer periphery about a center rotation axis and at least one first attachment element. The chain protector includes a protecting portion and an attachment portion disposed radially inwardly of the protecting portion. The attachment portion has at least one second attachment element that mates with the first attachment element in response to relative rotational movement between the sprocket element and the chain protector.

What is needed is a sprocket guard capable of retrofit comprising a coplanar sprocket surface, guard surface and fastener collar surface. The present invention meets this need.

SUMMARY OF THE INVENTION

The primary aspect of the invention is to provide a sprocket guard capable of retrofit comprising a coplanar sprocket surface, guard surface and fastener collar surface.

Other aspects of the invention will be pointed out or made obvious by the following description of the invention and the accompanying drawings.

The invention comprises a sprocket guard comprising a sprocket having sprocket radial spokes, and having teeth on an outer perimeter, the teeth disposed in a plane CL1, each sprocket radial spoke communicating with a first cylindrical surface, a circular member having circular member radial spokes, and each circular member radial spoke communicating with a second cylindrical surface, a collar having an outer cylindrical surface, a fastener engaging the collar, the first cylindrical surface and the second cylindrical surface engaging the outer cylindrical surface, all coplanar in a plane CL2, and plane CL1 is offset from plane CL2.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
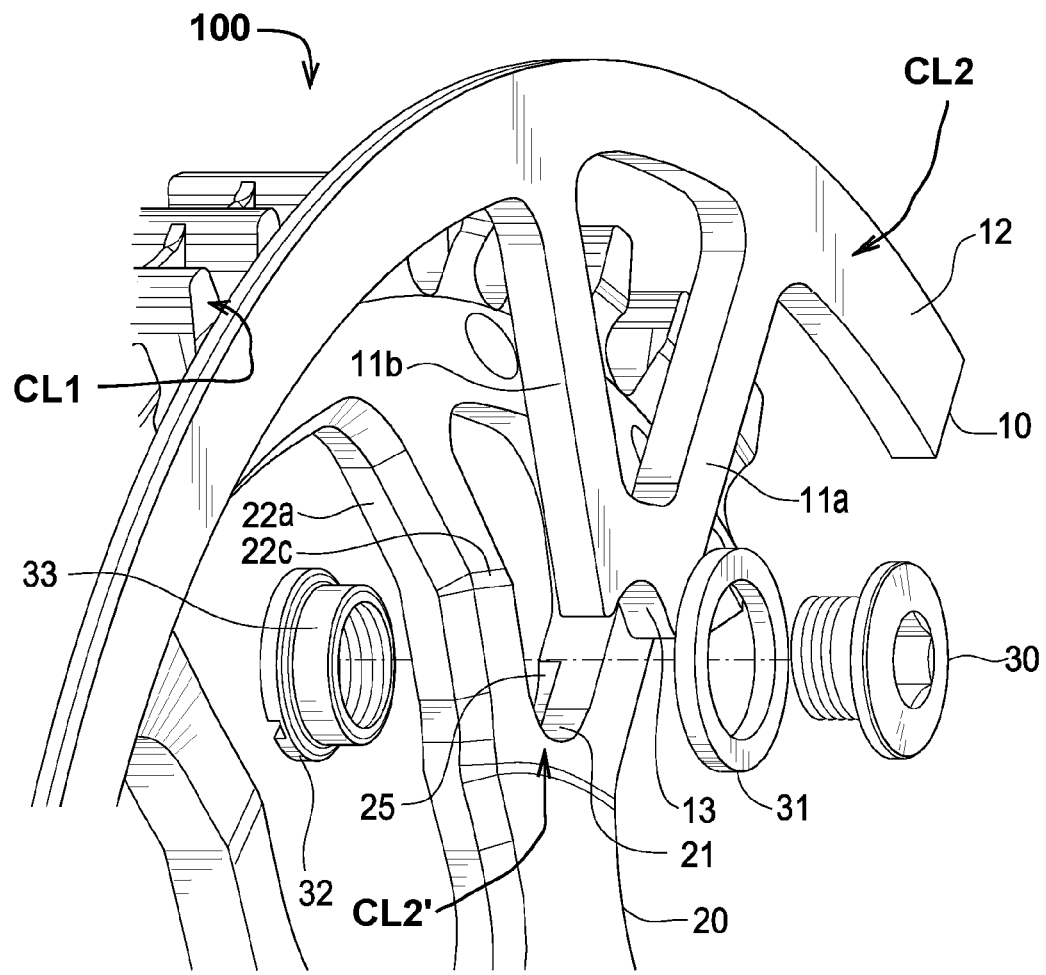
FIG. 1 is a front perspective view.

FIG. 1 is a partially fragmented, exploded, front perspective view. In FIG. 1, sprocket guard assembly 100 includes sprocket 20 and guard 10. Guard 10 cooperates with an outer perimeter of a crank sprocket 20. The crank is used on a bicycle (see crank 70 in FIG. 5).

Guard 10 is circular and is mounted to sprocket 20 using a threaded fastener 30 which engages a collar 32. Washer 31 ensures that fastener 30 does not loosen during use.

Collar 32 comprises an outer cylindrical surface 33. Surface 33 engages receiving surface 21. Surface 21 is cylindrical and is formed between two spokes 22a and 22b of sprocket 20. Surface 21 is typical in known sprockets.

Surface 21 engages surface 33. Each radial spoke 22a and 22b comprise an offset 22c which displaces teeth 23 axially along a rotational axis A-A. Teeth 23 engage a belt or other endless member.

Guard 10 comprises radial spokes 11a and 11b. Vertex 11c of spokes 11a and 11b comprises a cylindrical surface 13. Surface 13 engages surface 33.

Figure 2:
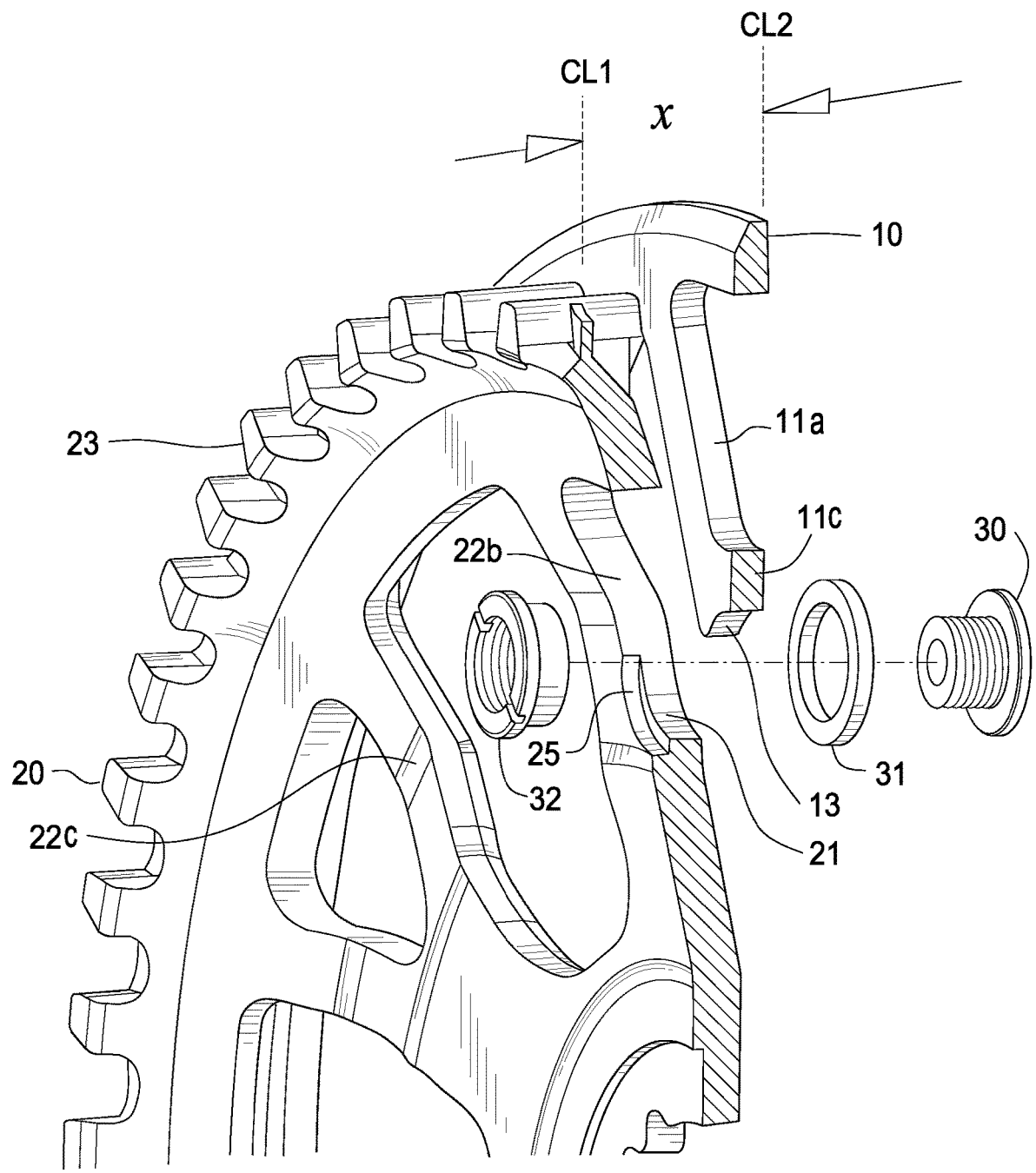
FIG. 2 is a back perspective view.

FIG. 2 is a back perspective view. Teeth 23 are on a plane CL1 that is normal to a rotational axis A-A. Guard outer ring 12 is on a plane CL2 that is normal to a rotational axis A-A. Plane CL1 is offset from plane CL2 by a distance "x". Offset 22c allows existing sprockets to be retrofit with guard 10 without need for drilling mounting holes in sprocket 20. Collar 32, surface CL2' and a surface of washer 31 are coplanar in plane CL2. An outer edge of collar 32 engages recess 25, thereby locating the position of collar 32 with respect to sprocket 20. Recess 25 is located on an inboard side of sprocket 20 between spokes 22a and 22b thereby enhancing an aesthetic appearance of the crank sprocket, with or without the installed device.

Figure 3:
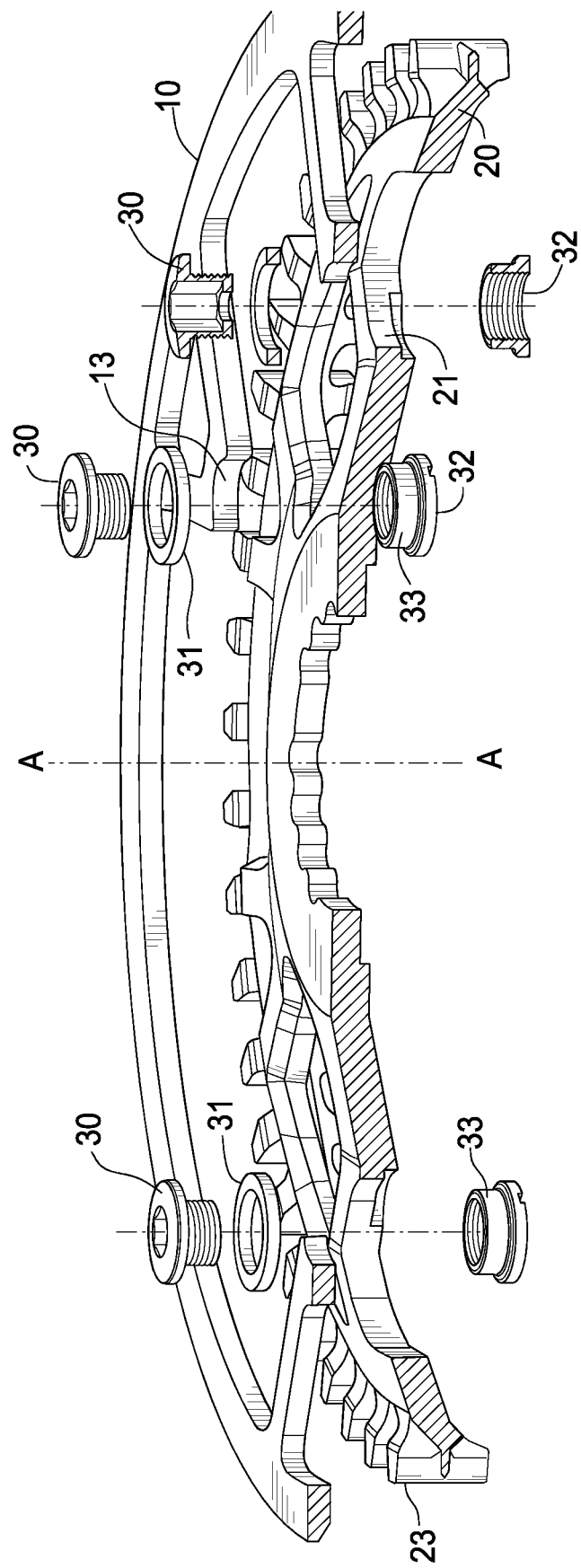
FIG. 3 is a side perspective view.

FIG. 3 is a side perspective view. A plurality of fasteners 30 can be used to install a guard on an existing sprocket.

Figure 4:
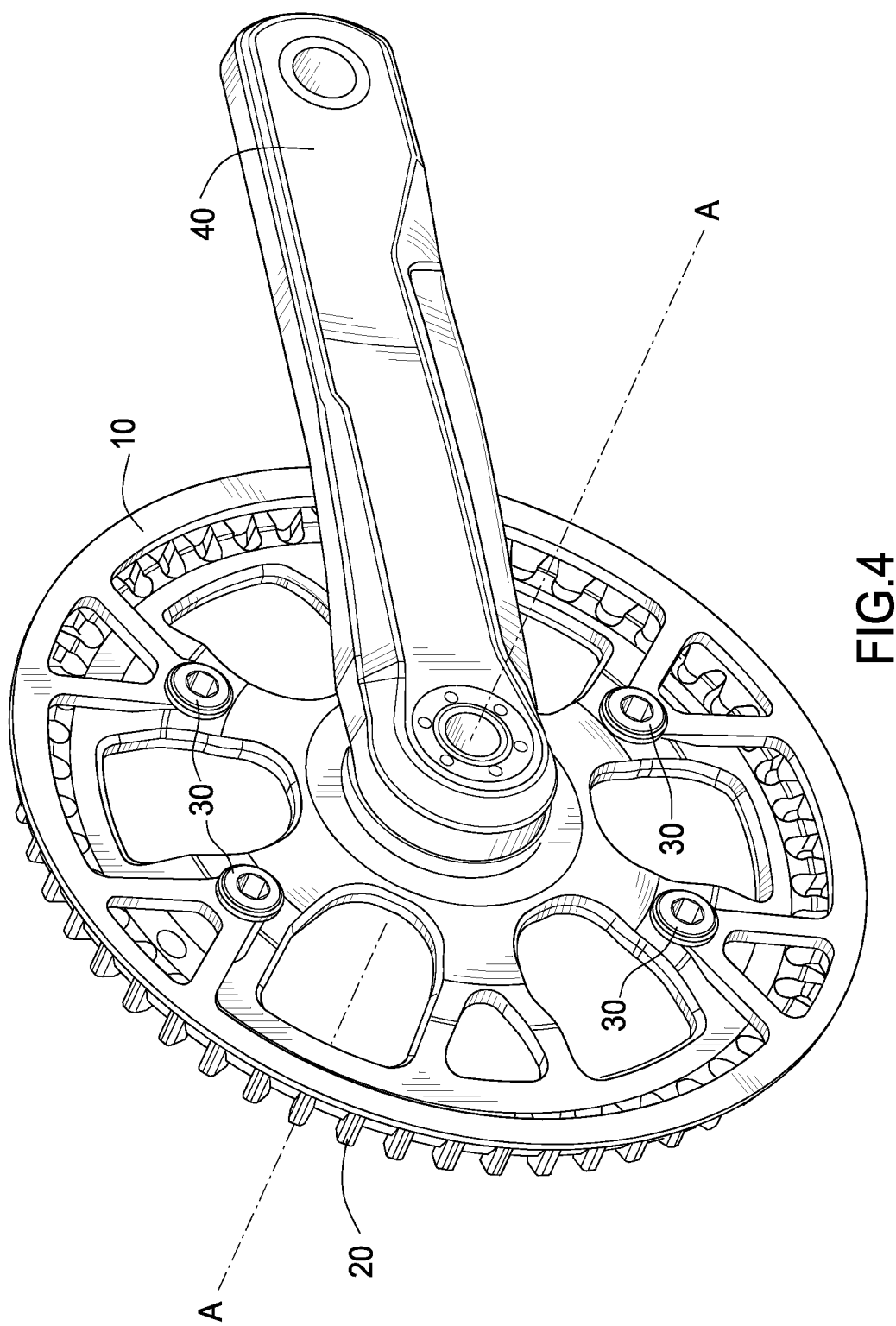
FIG. 4 is a side view of a crank.

FIG. 4 is a side view of a crank. A crank arm 40 extends from each side of the crank in a manner known in the art. Guard 10 prevents shoelaces or pant legs from contacting the sprocket or entangling with the endless member.

A sprocket guard assembly comprises a sprocket having sprocket radial spokes, and having teeth on an outer perimeter, the teeth disposed in a plane CL1, each sprocket radial spoke communicating with a first cylindrical surface, a circular member defining plane CL2 and having circular member radial spokes, and each circular member radial spoke communicating with a second cylindrical surface, a collar having an outer cylindrical surface, a fastener engaging the collar, the first cylindrical surface and the second cylindrical surface engaging the outer cylindrical surface and residing or extending between plane CL2 and plane CL1, and plane CL1 is offset from plane CL2.

Figure 5:
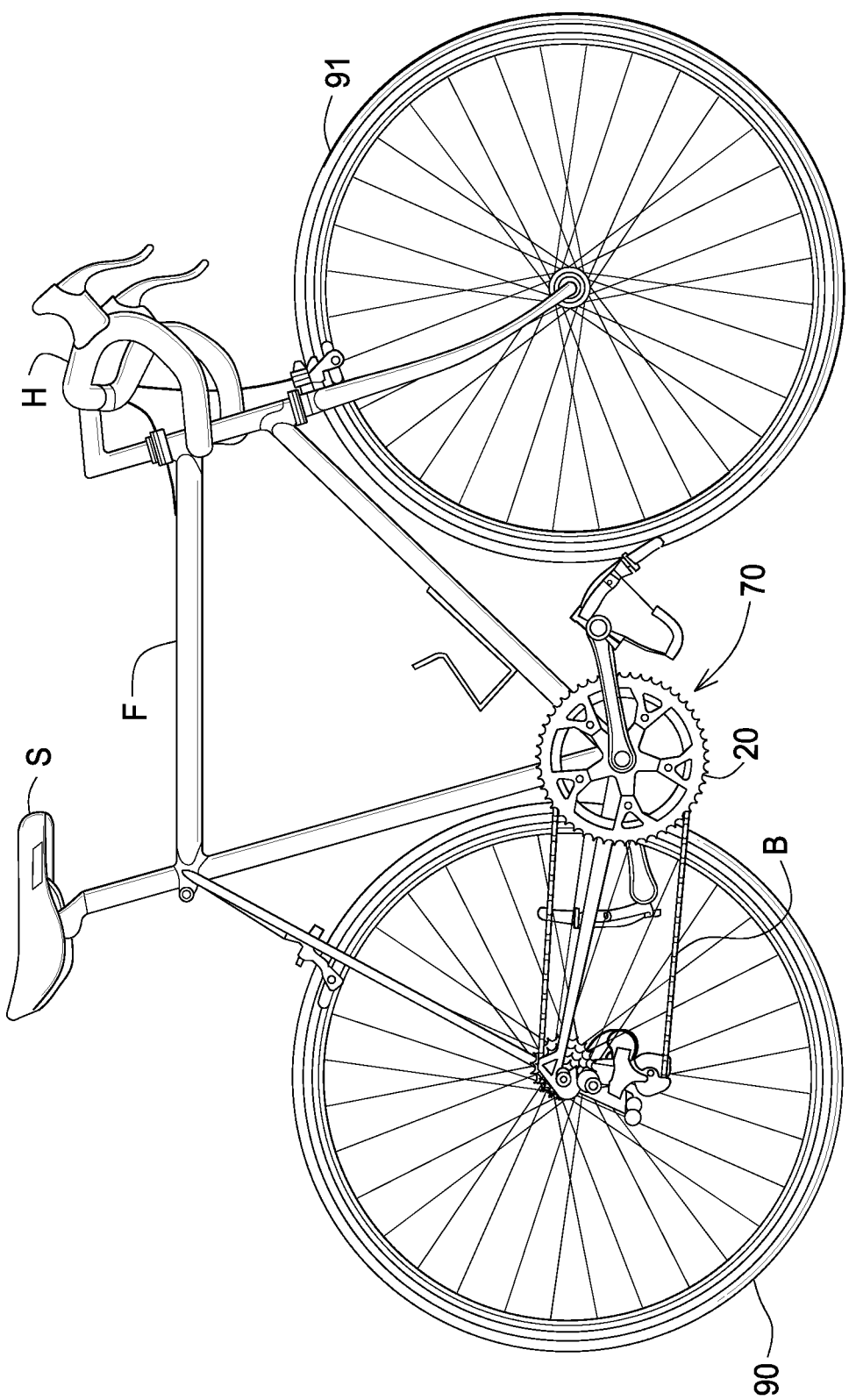
FIG. 5 is a side view of a bicycle.

FIG. 5 is a side view of a bicycle. Crank 70 is mounted to a bicycle bottom bracket (not visible). A belt B (or chain)

is engaged between sprocket 20 and a hub of the rear wheel 90. The bicycle also comprises a frame F, seat S, and front wheel 91, handlebars H, all known in the art.

Although a form of the invention have been described herein, it will be obvious to those skilled in the art that variations may be made in the construction and relation of parts without departing from the spirit and scope of the inventions described herein.

We claim:

1. A sprocket guard comprising:
   a sprocket having sprocket radial spokes, and having teeth on an outer perimeter, the teeth disposed in a first plane (CL1);
   each sprocket radial spoke communicating with a corresponding first cylindrical surface;
   a circular member defining an axis and a second plane (CL2) perpendicular to the axis; the circular member having circular member radial spokes, and each circular member radial spoke communicating with a corresponding second cylindrical surface;
   a collar having an outer cylindrical surface; and
   a fastener engaging the collar;
   wherein the first plane (CL1) is parallel to and offset from the second plane (CL2);
   and the first cylindrical surface and the second cylindrical surface engaging the outer cylindrical surface, all extending axially from the second plane (CL2) to the first plane (CL1).

2. The sprocket guard as in claim 1, wherein the teeth engage an endless member.

3. The sprocket guard as in claim 1, wherein the teeth engage a belt.

4. The sprocket guard as in claim 1, wherein the fastener is threaded.

5. The sprocket guard as in claim 1, wherein the sprocket comprises a recess for receiving the collar.

* * * * *